United States Patent
Tateishi et al.

(10) Patent No.: US 9,240,720 B2
(45) Date of Patent: Jan. 19, 2016

(54) EMULATION BASED RIPPLE CANCELLATION FOR A DC-DC CONVERTER

(71) Applicant: Texas Instruments Incorporated, Dallas, TX (US)

(72) Inventors: Tetsuo Tateishi, Aichi (JP); Xuening Li, Dongguan (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 59 days.

(21) Appl. No.: 14/292,956

(22) Filed: Jun. 2, 2014

(65) Prior Publication Data

US 2014/0361755 A1    Dec. 11, 2014

Related U.S. Application Data

(60) Provisional application No. 61/832,049, filed on Jun. 6, 2013.

(51) Int. Cl.
*H02M 3/158* (2006.01)
*H02M 1/00* (2007.01)

(52) U.S. Cl.
CPC ............ *H02M 3/158* (2013.01); *H02M 3/1588* (2013.01); *H02M 2001/0009* (2013.01); *H02M 2001/0025* (2013.01)

(58) Field of Classification Search
CPC ..................... H02M 2001/0009; H02M 3/156; H02M 3/1588; H02M 1/15; H02M 1/14
USPC .......................................................... 323/285
See application file for complete search history.

(56) References Cited

U.S. PATENT DOCUMENTS

| | | | |
|---|---|---|---|
| 5,600,234 A * | 2/1997 | Hastings | G05F 1/575 323/282 |
| 5,912,552 A | 6/1999 | Tateishi | |
| 5,929,692 A * | 7/1999 | Carsten | H02M 1/15 323/271 |
| 6,057,675 A | 5/2000 | Tateishi | |
| 6,140,801 A | 10/2000 | Aoki et al. | |
| 6,348,783 B2 | 2/2002 | Tateishi | |
| 6,348,833 B1 | 2/2002 | Tsujimoto et al. | |
| 6,469,481 B1 | 10/2002 | Tateishi | |
| 6,642,696 B2 | 11/2003 | Tateishi | |
| 6,812,676 B2 | 11/2004 | Tateishi | |
| 6,924,633 B2 | 8/2005 | Sanzo et al. | |
| 6,977,488 B1 | 12/2005 | Nogawa et al. | |
| 6,989,999 B2 | 1/2006 | Muramatsu et al. | |
| 7,595,624 B2 | 9/2009 | Tateishi et al. | |

(Continued)

OTHER PUBLICATIONS

Texas Instruments TPS51367, "22-V Input, 12-A Integrated FET Converter With Ultra-Low Quiescent (ULQTM)", www.ti.com, SLUSBB7A, Mar. 2013, Revised Jun. 2013.

(Continued)

*Primary Examiner* — Harry Behm
*Assistant Examiner* — Peter Novak
(74) *Attorney, Agent, or Firm* — William B. Kempler; Frank D. Cimino

(57) ABSTRACT

DC to DC converters and pulse width modulation controllers are presented with compensation circuitry to mitigate discontinuous conduction mode (DCM) undershoot and continuous conduction mode offsets in inductor current emulation information by providing compensation signals proportional to the output voltage and the converter off time (Toff) when the low side converter switch is actuated.

20 Claims, 8 Drawing Sheets

(56) References Cited

U.S. PATENT DOCUMENTS

| | | |
|---|---|---|
| 7,652,461 B2 | 1/2010 | Tateishi |
| 7,872,456 B2 | 1/2011 | Li et al. |
| 8,058,860 B2 | 11/2011 | Tateishi |
| 8,269,570 B2 | 9/2012 | Li et al. |
| 8,476,887 B2 | 7/2013 | Tateishi et al. |
| 8,587,967 B2 | 11/2013 | Cohen |
| 8,922,187 B2 * | 12/2014 | Swanson .............. H02M 3/1584 323/272 |
| 2001/0022512 A1 | 9/2001 | Tateishi |
| 2004/0085048 A1 | 5/2004 | Tateishi |
| 2013/0015830 A1 * | 1/2013 | Zhang ..................... H02M 1/14 323/282 |
| 2014/0239924 A1 * | 8/2014 | Guo ......................... G05F 1/46 323/271 |

OTHER PUBLICATIONS

Zhang et al., Texas Instruments, "D-CAP Mode With All-Ceramic Output Capacitor Application", Application Report, SLVA453, Feb. 2011.

* cited by examiner

US 9,240,720 B2

EMULATION BASED RIPPLE CANCELLATION FOR A DC-DC CONVERTER

This application claims priority to and the benefit of U.S. Provisional Patent Application Ser. No. 61/832,049 that was filed on Jun. 6, 2013 and is entitled ACCURACY-ENHANCED RAMP-GENERATION CIRCUIT FOR EMULATED CURRENT MODE DCDC CONVERTERS, the entirety of which is incorporated by reference herein.

FIELD OF THE INVENTION

The present disclosure relates to control of DC to DC converters and more particularly to improved inductor current emulation circuitry for DC to DC converter controllers.

BACKGROUND

DC to DC converters provide stable regulated supply voltages for operating processors, ASICS, memory, and other circuitry. Emulated current mode DC/DC converters use emulated inductor current information from an RC network to supplement output voltage feedback for comparison with a reference voltage for closed loop pulse width modulation (PWM) control of high and low side converter switches. FIG. 1 shows an on-time controlled DC to DC converter 10 providing an output voltage Vout to a load 2 using high and low side switches S1 and S2 connected in series with one another between an input voltage Vin and a circuit ground 3, with a switching node SW connecting the two switches together and an output inductor 4 connected between the switching node SW and the converter output. Switching control signals are provided to the high and low side switches S1 and S2 in alternating fashion by a driver circuit 5 according to an output provided by a loop comparator 7. The loop comparator 7 receives a voltage reference VREF and a feedback signal FB, along with a differential emulated current input CSP, CSN from an emulated inductor current circuit 100, and provides closed loop regulation of the output voltage Vout through pulse width modulation control of the switches S1 and S2. The circuit 100 includes a current sensor provided by RS1 and CS1 providing a signal indicated emulated inductor current information, as well as a second RC network including RS2 and CS2 for removing DC inductor current information to reduce regulation effects associated with the inductor DC resistance.

For on-time control of the converter 10, the valley voltage of the positive current sense input CSP is used by the PWM comparator 7, leading to unintended switching due to undershoot in discontinuous conduction mode (DCM) operation, as well as undesirable output offset during continuous conduction mode (CCM) operation. FIGS. 2 and 3 illustrate these problems, where a graph 120 in FIG. 2 shows the differential signal CSP, CSN provided by the emulated inductor current circuit 100 of FIG. 1 in DCM mode 122 and CCM mode 124. As seen in FIG. 2, a switching event during DCM operation 122 leads to the CSP signal undershooting the voltage level of the CSN signal. A graph 130 in FIG. 3 shows the reference voltage signal curve 132 (VREF), the output voltage feedback signal curve 134 (FB) as well as a curve 136 showing the summation (SUM) of the voltage feedback FB and the differential emulated current input CSP, CSN. In addition, graph 140 in FIG. 3 shows a curve 142 illustrating the differential voltage input signal VCSP-VCSN, and graph 150 illustrates a curve 152 showing the inductor current for DCM operation 122 and CCM operation 124. As seen in graph 140 of FIG. 3, the initial switching operations 138 of the high side switch S1 during DCM operation 122 cause an initial undershoot with the curve 142 undershooting by an amount 126 below zero (VCSN>VCSP, also seen at 126 in FIG. 2), leading to a pair of subsequent switching operations shown at 144 in graph 140 and 154 in the inductor current graph 150 due to the closed loop operation of the loop comparator 7. This undesirable ringing operation leads to switching noise in the converter output voltage Vout, and the undershoot 126 causes a multi-pulse issue at the CCM/DCM boundary when the output capacitance across the load 2 is large and the output voltage rise per single switching becomes smaller than the undershoot. In addition, the operation of the emulated inductor current circuit 100 in the converter 10 of FIG. 1 leads to the lowermost or "valley" voltage of the CSP having an offset 128 corresponding to the half of ripple voltage during CCM operation 124, as seen in FIGS. 2 and 3. In this regard, the offset is almost zero in DCM operation 122, and thus switching from DCM operation 122 to CCM operation 124 causes an increase in the converter regulation point. Thus, while removing the DC component from the emulated inductor current information advantageously avoids regulation based on the inductor DC resistance, improved DC to DC converters and PWM controller inductor current emulation circuitry are desirable to mitigate or avoid different regulation points in DCM and CCM operation as well as unintended switching operations caused by undershoot in DCM operation.

SUMMARY

DC to DC converters, pulse width modulation controllers and inductor current emulation circuitry are provided, in which emulated inductor current information is modified according to a DC to DC converter output voltage Vout and the converter off time Toff during which the low side switch is turned on in order to mitigate the above-mentioned DCM undershoot and CCM regulation point offset problems associated with previous emulated current DC to DC converters.

In accordance with one aspect of the disclosure, a DC to DC converter is provided, which includes a switching circuit having first and second (e.g., high and low side) switches, as well as an inductor connected between a switching node and a converter output node, and a modulator circuit providing control signals to operate the switches to control the converter output voltage. An inductor current emulation circuit is provided, including a first emulation circuit with an emulator capacitance coupled between a first emulation circuit output node and the converter output node, and a resistance coupled between the switching node and the first emulation circuit output node to conduct discharging current flowing out of the emulator capacitance when the low side converter switch is on. The first emulation circuit provides a voltage signal having peaks and valleys at the first emulation circuit output node, and a second emulation circuit provides a voltage signal to a second emulation circuit output node representing an average voltage of the switching node. The converter also includes a loop comparator with a first input coupled to receive a feedback voltage, a second input coupled to receive a reference signal, a third input coupled to receive the emulated current signal, and an output providing a signal to the modulator to regulate the output voltage based at least partially on the feedback voltage signal, the reference signal, and valleys of the emulated current signal. The converter further comprises a compensation circuit operative to selectively reduce the discharging current flowing out of the emulator capacitance when the second switch is on to cancel at least a portion of a ripple voltage at the converter output node.

DESCRIPTION OF THE DRAWINGS

The following description and drawings set forth certain illustrative implementations of the disclosure in detail, which are indicative of several ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
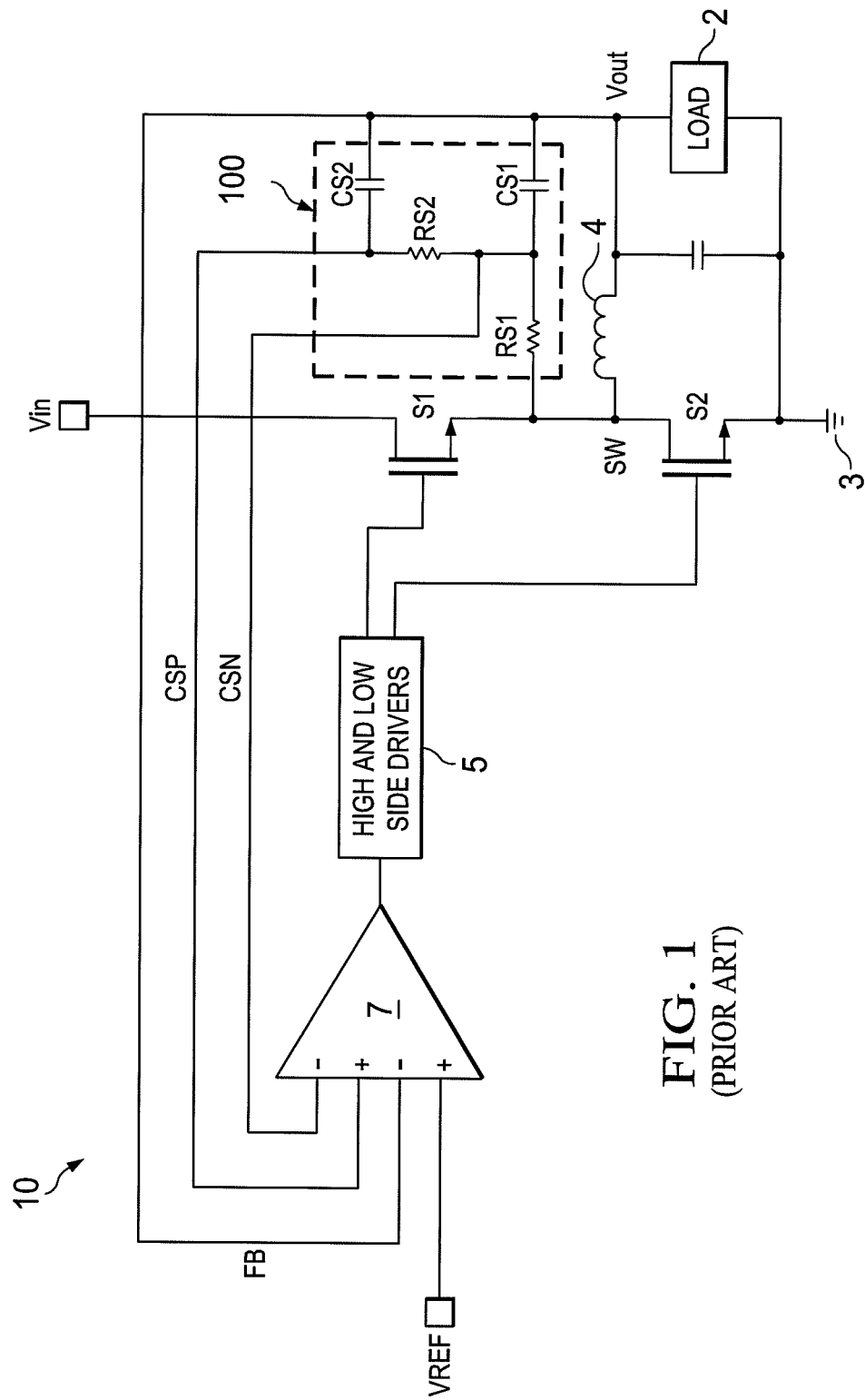
FIG. 1 is a schematic diagram illustrating a prior art DC to DC converter with an inductor current emulation circuit including a first RC circuit for emulating the inductor current and a second RC circuit for removing a DC component.

One or more embodiments or implementations are hereinafter described in conjunction with the drawings, wherein like reference numerals are used to refer to like elements throughout, and wherein the various features are not necessarily drawn to scale.

Figure 4:
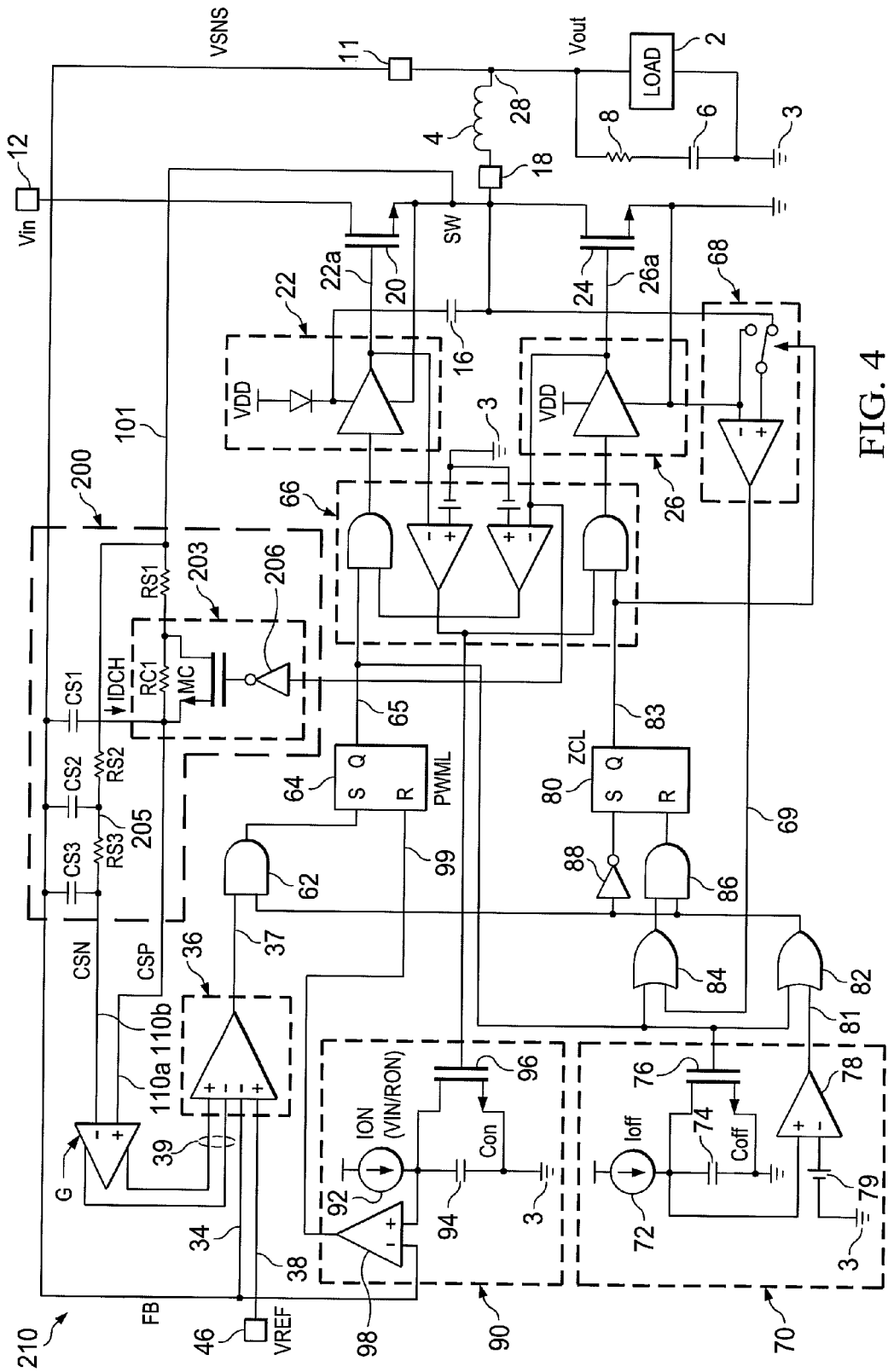
FIG. 4 is a schematic diagram illustrating a DC to DC converter with a PWM controller including a first embodiment of an improved inductor current emulation circuit.

Referring to FIGS. 4-7, a DC to DC converter embodiment 210 is illustrated in FIG. 4 providing an output voltage Vout to drive a load 2 connected between a converter output node 28 and a circuit ground 3. The converter 210 in this non-limiting example is a buck converter with a switching circuit having first and second (high side and low side) switches 20 and 24 and an output inductor 4 connected between a switching node 101 (SW) and the output node 28. An output capacitor 6 having an associated equivalent series resistance (ESR) 8 is connected between the converter output node 28 and the circuit ground 3 in parallel with the driven load 2. The inductor 4 may be an external component connected to a PWM controller integrated circuit (IC) in certain embodiments via a switching node terminal 18 and an output voltage sense (VSNS) terminal 11 as shown in FIG. 4. The DC to DC converter 210 includes a modulator operating at a pseudo constant frequency, although constant frequency or pseudo constant frequency operation is not a strict requirement of all embodiments, and general operation of suitable modulators and associated circuitry is described in U.S. Pat. Nos. 6,642,696, 7,652,461, and 8,476,887, the entireties of which are hereby incorporated by reference.

The DC to DC converter 210 in FIG. 4 includes a switching circuit formed by the upper and lower switching devices 20 and 24 (NMOS field effect transistors (FETs) in this non-limiting example) connected between an input supply voltage Vin and the circuit ground 3 and the switches 20 and 24 are connected to one another at the switching node 101. High and low driver circuits 22 and 26 provide switching control signals to the switches 20 and 24, respectively, based on a modulated output signal 65 from a flip-flop or PWM latch 64 (PWML). The latch 64 in this embodiment provides an input signal to a cross conduction control circuit 66 which in turn provides inputs to the drivers 22 and 26 for complementary pulse width modulation operation of the high and low switching devices 20 and 24 via corresponding driver output signals 22a and 26a to control the output voltage Vout provided to the load 2. In certain embodiments, a PWM controller integrated circuit (IC) implementation includes the modulator and may, but need not, include the switches 20 and 22, and may provide associated terminals for connection thereto. A voltage sense (VSNS) input terminal 11 is provided for connection to a converter output node 28 to sense the DC to DC converter output voltage Vout, and an input voltage terminal 12 can be included for receiving the input voltage Vin as shown in FIG. 4. Other embodiments are possible in which the switching devices 20 and 24 and/or the associated drivers 22 and 26 may be external to the controller IC, and the IC may include suitable terminals for connecting such components to the internal modulator circuitry. The PWM control circuitry generally operates in closed loop fashion to regulate the output voltage Vout according to a reference voltage VREF, which is an external input signal provided to the PWM controller IC via a reference voltage terminal 46 in the illustrated embodiment, or which may be an internal (e.g., fixed) reference voltage in other embodiments.

The PWM latch 64 together with the drivers 22, 26, a cross conduction control circuit 66, and a loop comparator 36 form a modulator circuit as part of a PWM controller implementation. The loop comparator 36 provides an output 37 to the set input "S" of the PWM latch 64 through an AND gate 62 to regulate the converter output voltage Vout based on a feedback signal (FB) connected to a non-inverting first comparator input 34, and the output voltage regulation is also based at least partially on a differential emulated current signal CSP, CSN provided by an inductor current emulation circuit 200 described further below. The feedback signal FB in this case is provided as the output voltage Vout from the converter output node 28, although other embodiments may provide a feedback reference input to the loop comparator 36 from a resistive divider or other feedback circuit (not shown). In this regard, the reference voltage input may also be obtained directly from an external reference voltage signal VREF, or may be derived therefrom, for example, via a resistive divider circuit (not shown) in various implementations.

The output 65 ("Q") of the PWM latch 64 in the illustrated example is provided as an input to the cross conduction control circuit 66, as well as to a minimum off-time timer circuit 70, and to OR gates 82 and 84. The timer circuit 70 includes a current source 72 (Ioff) connected between a positive supply voltage and an upper terminal of an off-time timer capacitor 74 (Coff) whose lower terminal is connected to the circuit ground, with an NMOS transistor 76 receiving the PWM latch output 65 and selectively shorting (e.g., discharging) the voltage across the capacitor 74 in response. The current source 72 and the capacitor 74 thereafter provide a rising voltage signal to a non-inverting input of a comparator 78 which is compared with a reference voltage 79 such that the comparator 78 provides an output signal to an input of the OR gate 82. The output of the OR gate 82 is provided as a second input to the AND gate 62 for controlling the S input of the PWM latch 64 to thereby control the minimum amount of time that the PWM latch output signal 65 is off (minimum Toff).

As further seen in FIG. 4, a zero crossing comparator circuit 68 compares the voltage at the switch node 101 with the circuit ground 3 and provides a zero crossing signal 69 as a second input to the OR gate 84. The OR gates 82 and 84 provide inputs to an AND gate 86 whose output controls a reset "R" input to a zero crossing latch (ZCL) 80 having a set "S" input driven through an inverter 88 by the output of the OR gate 82 as shown. In the illustrated embodiment, moreover, the cross conduction control circuit 66 compares the output 22a of the driver 22 with a reference voltage to provide an output signal controlling an on-time timer circuit 90 including a current source 92 (Ion, which is set in certain implementations to be a ratio of the input voltage Vin to an external control resistor Ron), a timing capacitor 94 (Con), a control transistor 96, and a comparator 98 which compares a rising voltage across the capacitor 94 with the sensed output voltage 28 and provides an output signal 99 to the reset "R" input of the PWM latch to control the on-time of the PWM switching signals provided to the drivers 22 and 26. The PWM control circuitry thus provides a closed-loop modulator which generates a high side or first driver control signal 22a to turn the high side or first switch 20 on or off, as well as a low side or second switching control signal 26a to selectively turn the low side or second switch 24 on or off to control the DC to DC converter output voltage Vout provided to the load 2. Although illustrated using NMOS converter switches 20 and 24, other implementations are possible using an NMOS and/or PMOS devices, bipolar switches, or other form of semiconductor-based switching devices, with the modulator circuitry being adapted to provide the necessary switching control signals for operation of the high and low side switches according to known DC to DC converter principles.

Figure 5:
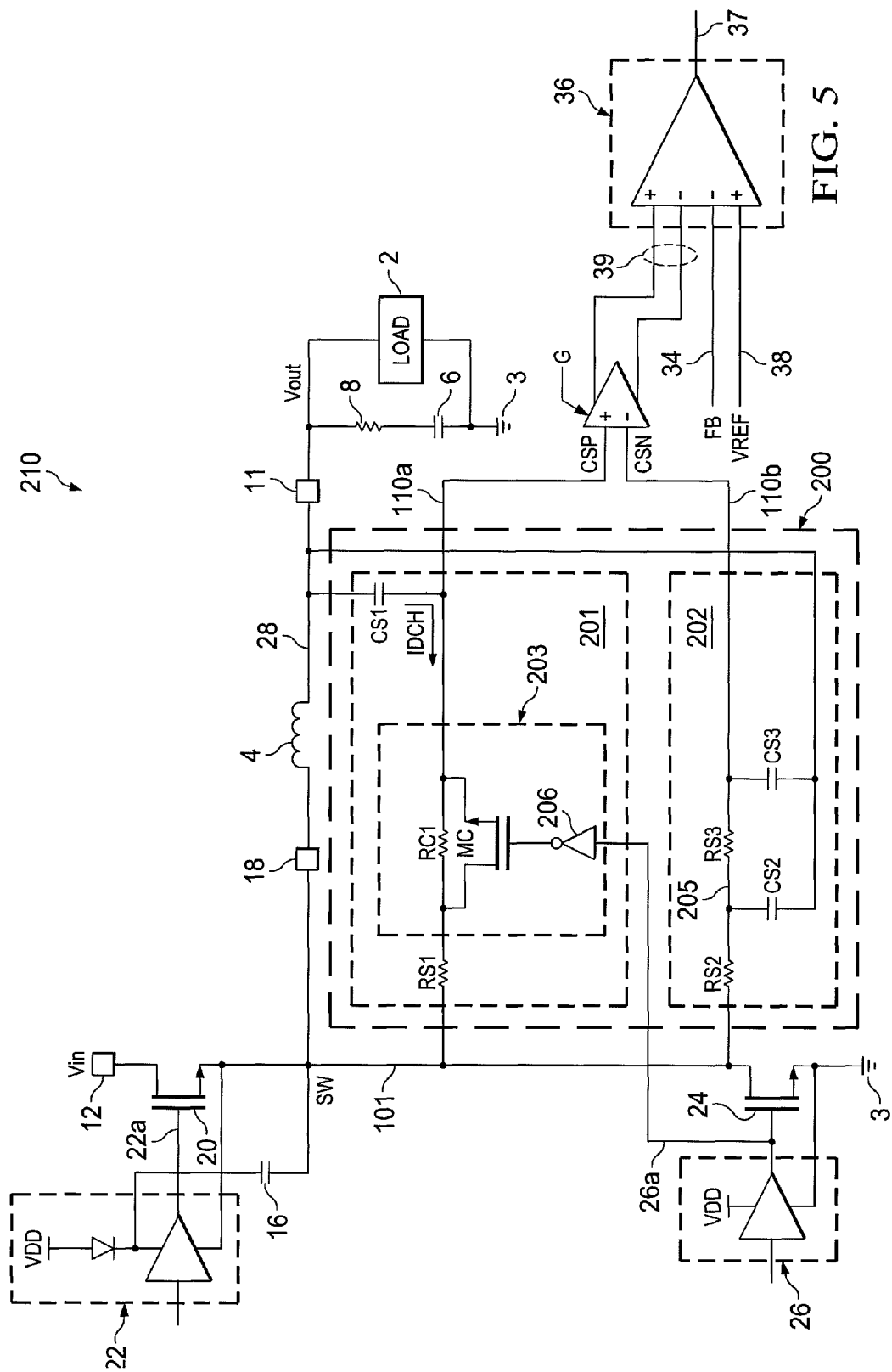
FIG. 5 is a schematic diagram illustrating further details of the inductor current emulation circuit embodiment of FIG. 4.

Referring now to FIGS. 4 and 5, the emulated inductor current information generation circuit 200 in one embodiment advantageously provides compensation in proportion to Vout (or the average voltage of the switching node 101) during the time Toff when the low side switch 24 is turned on via the signal 26a. The emulation circuit 200 provides a differential emulated current signal (e.g., a positive current sense voltage signal CSP and a negative current sense voltage signal CSN) at first and second emulation circuit output nodes 110a and 110b, with the differential signal CSP, CSN being directly connected to a corresponding differential input 39 of the loop comparator 36, or an amplifier G (e.g., transconductance amplifier in one embodiment) may be provided in certain implementations to receive the differential signal CSP, CSN at the nodes 110a and 110b, and to provide a differential output to the differential input 39 of the loop comparator 36 as shown in FIGS. 4 and 5.

The inductor current emulation circuit 200 in the embodiment of these figures includes first and second emulation circuits 201 and 202, respectively, with the first emulation circuit 201 including an emulator capacitance CS1 coupled (e.g., connected directly or coupled through one or more intervening components) between the first emulation circuit output node 110a and the converter output node 28. In other possible embodiments, the emulator capacitance CS1 can be coupled between the node 110a and a different constant voltage node, such as a circuit ground 3, for example. The first emulation circuit 201 further includes a resistance coupled between the switching node 101 and the node 110a, in this case a series combination of a first resistor RS1 and a compensation resistor RC1. In operation, when the high side switch 20 is on, the resistance RS1, RC1 conducts charging current flowing into the lower terminal of the emulator capacitance CS1. In this condition, the switching node 101 (SW) is pulled high to the input voltage Vin when the switch 20 is on and the switching node 101 is connected to Vin 12, whereby current flows from the switching node 101 through the resistance RS1 and transistor MC and into the lower terminal of the capacitance CS1. Conversely, when the low side switch 24 is on (and the high side switch 20 is off), the resistance RS1 and RC1 conducts discharging current (IDCH shown in FIGS. 4 and 5) flowing out of the lower terminal of the emulator capacitance CS1 since the switching node 101 is connected to the circuit ground 3 through the low side switch 24. Thus, during normal switching operation of the high and low side switches 20 and 24 (e.g., particularly in CCM operation), the first emulation circuit 201 provides a voltage signal CSP having peaks and valleys at the first emulation circuit output node 110a due to the switching operation of the high and low side switches 20 and 24.

The second emulation circuit 202 in the embodiment of FIGS. 4 and 5 provides the voltage signal CSN to the second emulation circuit output node 110b, and includes a first RC network including a resistance RS2 connected to the switching node 101 and a first capacitance CS2 connected between a node 205 and the converter output node 28. A second RC network is provided in the illustrated embodiment, including a resistance RS3 connected between the node 205 and the output node 110b, as well as a second capacitance CS3 connected between the second output node 110b and the converter output node 28. Thus, the second emulation circuit 202 provides the voltage signal CSN generally representing the average voltage of the switching node 101 SW. When the signals CSP and CSN are combined as a differential input to the loop comparator 36 (directly or through an intervening amplifier G as shown), the emulation circuit 200 provides emulated inductor current information with the DC component related to the DC resistance of the inductor 4 removed.

The loop comparator 36 includes a first comparator input 34 receiving the feedback voltage signal FB representing the output voltage Vout, as well as a second comparator input 38 receiving the reference signal VREF and a third input 39 coupled to receive the emulated current signal CSP, CSN (e.g., directly, or through an amplifier G as shown in the illustrated example). The loop comparator output 37 provides an output signal to the modulator to regulate the voltage Vout at the converter output node 28 at least partially according to the feedback voltage signal FB, the reference signal VREF, and valleys of the emulated current signal CSP, CSN. While the third input 39 of the loop comparator 36 is illustrated as a differential input having two terminals, other implementations are possible in which the third input to the loop comparator 36 is a single ended input, with a suitable amplifier (e.g., amplifier G) receiving the differential emulated current signal CSP, CSN at the nodes 110a, 110b, and providing a corresponding single ended (e.g., voltage) signal to the third loop comparator input 39.

In order to address DCM undershoot (e.g., 126 in FIGS. 2 and 3 above) and/or CCM regulation point offsets (e.g., 128 in FIGS. 2 and 3), the illustrated inductor current emulation circuitry 200 further includes a compensation circuit 203 operative to provide compensation generally proportional with the output voltage Vout and the off time Toff of the DC to DC converter 210. In the illustrated embodiment, this is accomplished by selectively reducing the discharging current IDCH flowing out of the emulator capacitance CS1 when the second switch 24 is on (e.g., during Toff) to cancel at least a portion of a ripple voltage at the converter output node 28. In this regard, the inventors have appreciated that the offset 128 shown in graphs 120 and 130 of FIGS. 2 and 3 above corresponds to half the ripple voltage at the converter output node, and is proportional to both the output voltage Vout and to the time period Toff during which the low side switch S2 in FIG. 1 is off. Without wishing to be tied to any particular theory, the inventors have appreciated that removing the DC component of the pseudo-inductor current using the circuit 100 and FIG. 1 reduces the influence of the inductor DC resistance, and that in practice the voltage drop across the inductor DC resistance is relatively small compared to the output voltage Vout. Moreover, assuming that the ramp height of the ripple voltage is small relative to the output voltage Vout, the ramp current Ir discharging from the emulator capacitance CS1 when the low side switch S2 is on (e.g., during the off time Toff) is approximately equal to Vout/RS1 in FIG. 1 above, and the ripple peak to peak voltage Vr is approximately equal to this current Ir multiplied by Toff/CS1.

Figure 2:
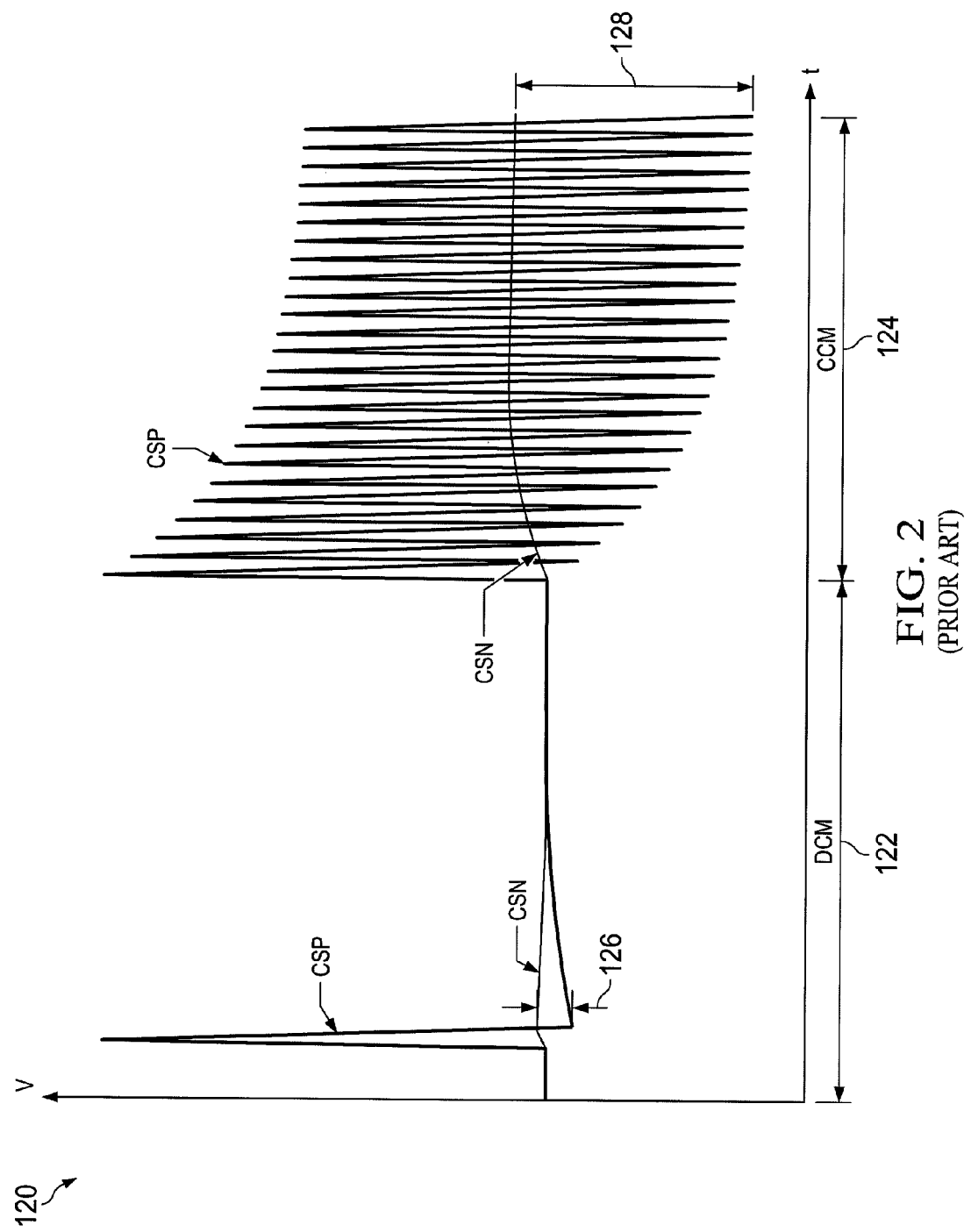
FIG. 2 is a graph illustrating voltage outputs of the current emulation circuit of FIG. 1 in DCM and CCM operation.

Accordingly, the inventors have appreciated that the offset 128 and the undershoot 126 in FIG. 2 can be effectively canceled or mitigated by adding a compensation current or voltage which is proportional to the output voltage Vout when the low side switch S2 is on (e.g., during the off time Toff). In the illustrated embodiment of FIGS. 4 and 5, moreover, the compensation circuit 203 operates during the off time to selectively reduce the discharging current IDCH flowing out of CS1 when the switch 24 is on (conductive) to cancel approximately half the continuous conduction mode ripple voltage at the converter output node 28. In this regard, all embodiments need not cancel exactly half the ripple voltage, but the inventors have appreciated that compensation generally proportional to the output voltage Vout during the off time advantageously counteracts the above-mentioned offset 128, thereby reducing or eliminating regulation point transitions between DCM and CCM operating modes and multiple-switching in DCM operation in the DC to DC converter 210. Thus, the illustrated embodiment can achieve compensation corresponding to approximately half the ripple voltage level by appropriate choice of component values in the inductor current emulation circuit 200, with component value tolerances and variations allowing for some amount of deviation from cancellation of exactly half the ripple voltage.

As seen in the example of FIGS. 4 and 5, for instance, the illustrated compensation circuit 203 provides a second resistor RC1 coupled in series with the first resistor RS1 between the switching node 101 and the first emulation circuit output node 110a, along with a transistor MC connected in parallel with the second resistor RC1. Any suitable switching device MC may be used in various embodiments, wherein the illustrated example employs an NMOS device. Moreover, while the parallel combination of RC1 and MC is shown connected between RS1 and the node 110a, other embodiments are possible in which RC1 and MC are connected to the switching node 101, and RS1 is connected between RC1 and the CSP signal node 110a, or another relative configurations by which the discharging resistance path for current flowing out of the capacitance CS1 is selectively modified for reduced discharging current operation during the off time Toff. In the illustrated embodiment of FIGS. 4-7, the compensation circuit 203 counteracts approximately half the ripple voltage regarding the valleys of the CSP signal in CCM operation. For a given DC to DC converter switching period Tsw in CCM operation (e.g., the reciprocal of the switching frequency), the value of the compensation resistor RC1 is set in certain embodiments according to the following formula to effectively compensate approximately half the ripple voltage:

$$RC1 = Tsw*RS1/2RS1*CS1-Tsw.$$

Other implementations are contemplated in which other circuitry is suitably provided to effectively modify the resistance which conducts the discharge current IDCH flowing out of the capacitance CS1 during all or at least a portion of the off time Toff to selectively reduce the discharging current IDCH flowing out of CS1 when the switch 24 is on. In this implementation, the compensation circuit 203 further includes an inverter 206 with an input connected to receive the low side driver output 26a, with the inverter output connected to the gate or control terminal of the transistor MC. In this manner, MC is effectively turned on (conductive, thereby shorting RC1 and effectively reducing the resistance between the nodes 101 and 110a), when the low side switch 24 is off, and MC is turned off (high impedance between its source and drain terminals) to increase the total resistance between the switching node 101 and the first emulation circuit output node 110a, thereby reducing the discharging current IDCH flowing out of the emulator capacitance CS1 when the low side switch 24 is on (e.g., during Toff).

Figure 3:
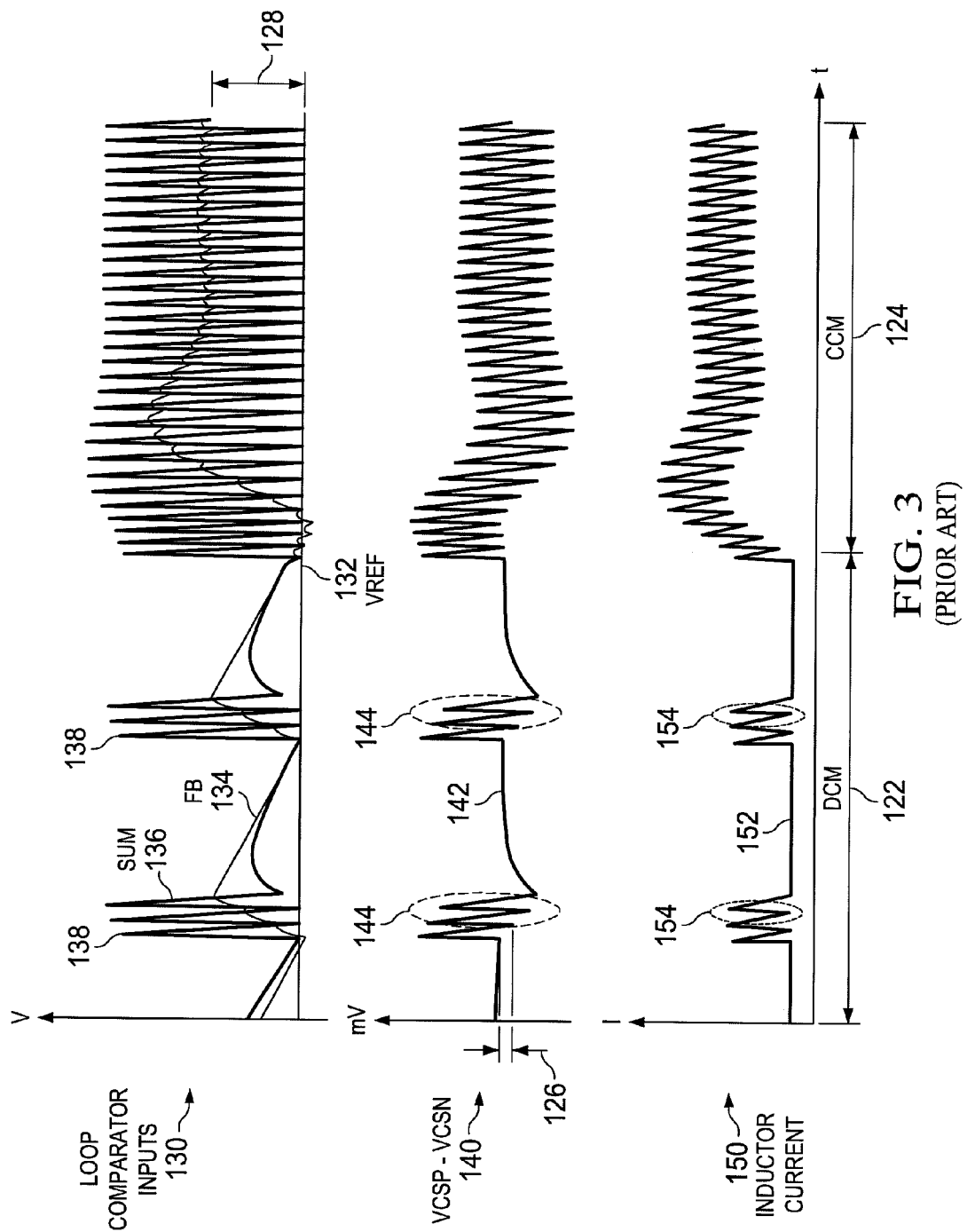
FIG. 3 shows graphs of the loop comparator inputs, the differential current emulation signal and inductor current in DCM and CCM operation of the converter of FIG. 1.
Figure 6:
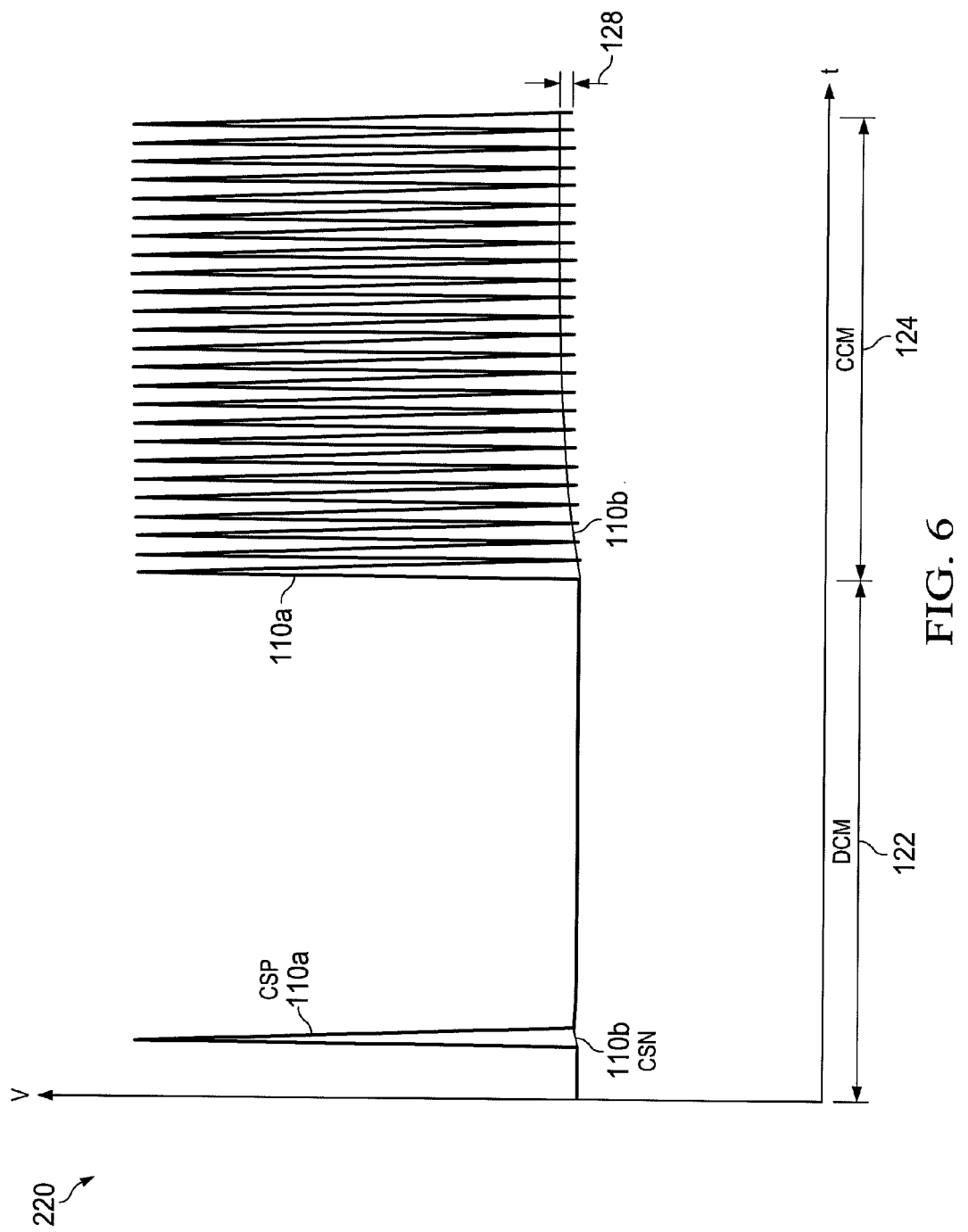
FIG. 6 is a graph illustrating the differential output of the current emulation circuit of FIGS. 4 and 5.
Figure 7:
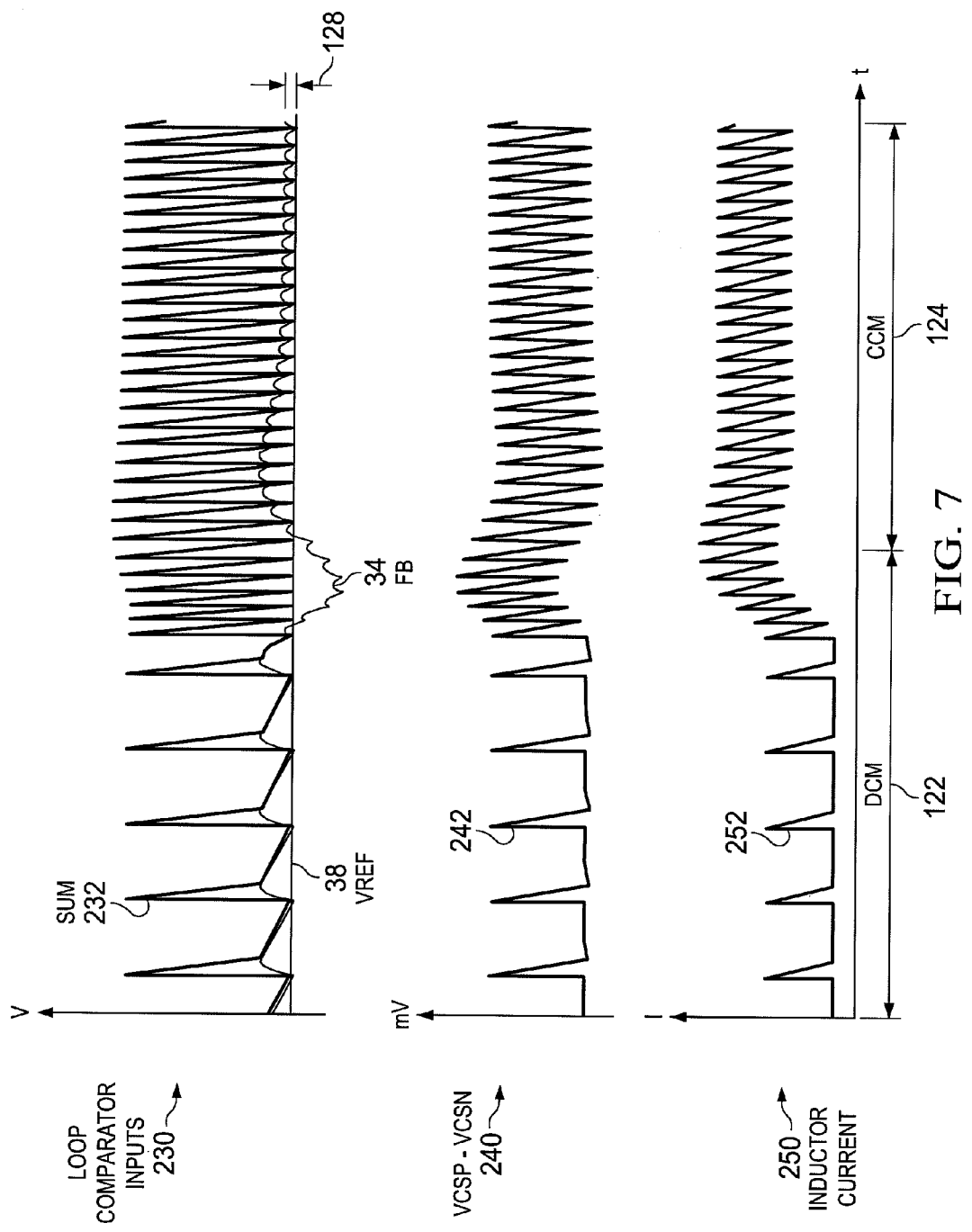
FIG. 7 illustrates graphs of loop comparator inputs, differential current emulation signal, and inductor current in the embodiment of FIGS. 4 and 5.

Referring also to FIGS. 6 and 7, the reduced discharge current IDCH during the off time counteracts the offset 128 of FIGS. 2 and 3 above, with the compensation circuit 203 thereby improving performance of the DC to DC converter 210, particularly during CCM operation. FIG. 6 provides a graph 220 illustrating the differential output CSP, CSN at the nodes 110a and 110b, respectively, in the current emulation circuit 200 of FIGS. 4 and 5, and FIG. 7 provides graphs 230, 240 and 250 showing loop comparator inputs, differential current emulation signal, and inductor current during DCM operation 122 and CCM operation 124 in the DC to DC converter 210 of FIGS. 4 and 5. The graph 230 in FIG. 7 illustrates a curve 232 of the summation (SUM) of the loop converter inputs 34 and 39, as well as the reference input 38 (VREF, shown as constant in this example), and the feedback curve at the input 34 (FB). In addition, graph 240 in FIG. 7 illustrates a curve 242 showing the VCSP-VCSN differential input voltage provided as an input to the loop comparator 36, and graph 250 shows an inductor current curve 252 for both DCM operation during the time range 122 and CCM operation during the time range 124.

As seen in the graphs 220 and 230, the offset 128 between the regulation point CSN and the valleys of the CSP signal is significantly reduced during CCM operation 124 compared with the previous offset shown in FIG. 2, whereby transition in operation from DCM mode 122 to CCM mode 124 is greatly improved via the compensated inductor current emulation circuitry 200. As further seen in the graphs 230, 240 and 250 of FIG. 7, moreover, the compensation circuitry 203 in the embodiment of FIGS. 4 and 5 effectively mitigates or eliminates undershoot in the CSP signal relative to the CSN signal, whereby DCM switching events do not lead to unwanted ringing or repetitive switching. Thus, the illustrated inductor current emulation circuitry 200 addresses the previous undershoot 126 seen in FIG. 2, and avoids or mitigates the extra switching seen at 144 and 154 in graphs 140 and 150 of FIG. 3 above.

Figure 8:
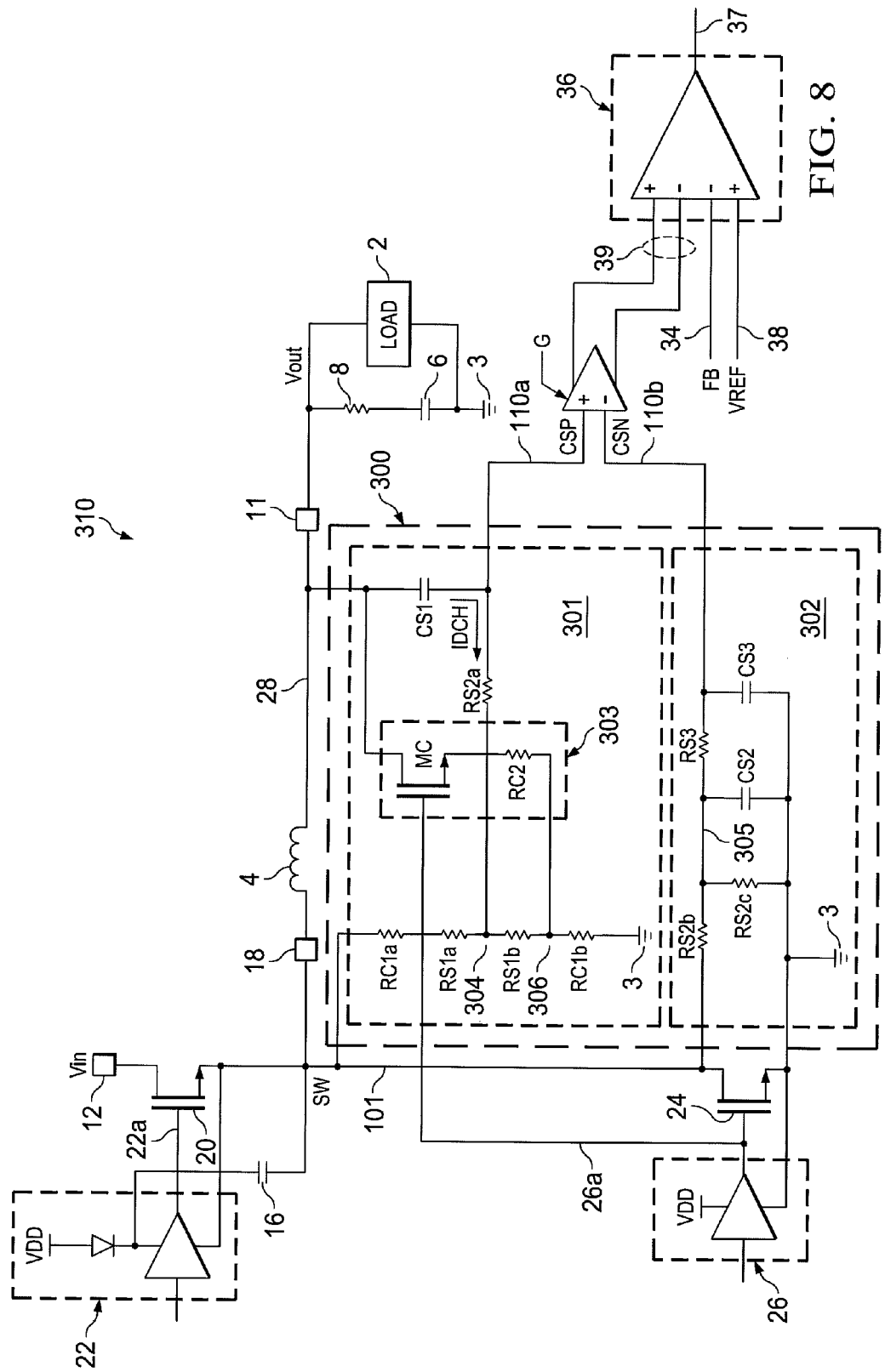
FIG. 8 is a schematic diagram illustrating a second improved inductor current emulation circuit embodiment.

FIG. 8 illustrates a portion of another non-limiting DC to DC converter embodiment 310 having high and low side switching devices 20 and 24 and associated drivers 22 and 26, respectively, and other modulator and feedback components generally as shown in FIG. 4 above. In this embodiment, an inductor current emulation circuit 300 is provided, including a first emulation circuit 301 with a capacitance CS1 between the nodes 110a and 28, as well as a resistance RC1a, RS1a, and RS2a coupled between the switching node 101 and the first emulation circuit output node 110a to conduct charging current flowing into the emulator capacitance CS1 when the high side switch 20 is on, and to conduct discharging current IDCH flowing out of the emulator capacitance CS1 when the low side switch 24 is on (during Toff). In other non-limiting embodiments, the emulator capacitance CS1 can be coupled between the node 110a and a different constant voltage node, such as a circuit ground 3, for example. As with the above embodiment of FIGS. 4-7, the first emulation circuit 301 in FIG. 8 provides a voltage signal CSP with peaks and valleys at the node 110a, and the loop comparator 36 operates at least in part to regulate around the valleys of CSP for on-time control of the DC to DC converter 310. In addition, a second emulation circuit 302 provides a voltage signal CSN to the output node 110b representing an average voltage of the switching node 101, where the CSP and CSN signals can be provided in certain embodiments to the input 39 of the loop comparator 36 directly and/or via an intervening circuit such as the transconductance amplifier G as shown. The loop comparator 36 also receives the feedback signal FB at the input 34 and the reference voltage signal VREF at the input 38 as previously described in connection with FIG. 4 above.

In this approach, first and second voltage divider circuits are provided in the compensation circuits 301 and 302 to approximately divide the voltage at the switch circuit 101 (SW) in half, where the first emulator circuit 301 includes a first voltage divider circuit RC1a, RS1a, RS1b and RC1b connected between the switching node 101 and the circuit ground 3, with a divider output node 304 providing a fraction of the voltage of the switching node 101 relative to the circuit ground 3, such as approximately equal to half the switching node voltage in one embodiment. In addition, the second emulator circuit 302 includes a voltage divider comprised of generally equal resistors RS2b and RS2c connected as shown to provide a fraction of the switch node voltage to an internal node 305, such as approximately equal to half the switching node voltage in one embodiment. The first emulator circuit 301 further includes a discharging resistor RS2a connected between the divider output node 304 and the CSP output node 110a to conduct the charging current flowing into the emulator capacitance CS1 when the high side switch 20 is on and to conduct the discharging current IDCH flowing out of the emulator capacitance CS1 when the low side switch 24 is on.

A compensation circuit 303 is provided in this embodiment to selectively reduce the discharging current IDCH flowing out of the emulator capacitance CS1 when the low side switch 24 is on, thereby canceling at least a portion of a ripple voltage at the converter output node 28 during the off time Toff. In certain implementations, moreover, the compensation circuit 303 operates to cancel approximately half the continuous conduction mode ripple voltage at the converter output node 28 via appropriate selection of the various component values in the emulation circuit 300. The compensation circuit 303 in this case includes a compensation resistor RC2 connected to a second divider circuit node 306, and a transistor MC is connected between the compensation resistor RC2 and the converter output node 28. The transistor MC in this case has a gate control terminal connected to the low side driver output 26a, and operates to selectively turn MC on (conductive) when the low side switch 24 is on (e.g., during Toff) to allow the compensation resistor RC2 to conduct, thereby reducing the discharging current IDCH flowing through RS2a out of CS1 during the off time.

The second emulation circuit 302 in this case includes the second voltage divider circuit formed by two generally equal second divider circuit resistances RS2b and RS2c connected in series with one another between the switching node 101 and the circuit ground 3, with a second divider output node 305 joining the second divider circuit resistances and providing a voltage approximately equal to half the voltage of the switching node 101 relative to the circuit ground 3. In addition, the second emulation circuit 302 includes an RC circuit with capacitors CS2 and CS3 and a resistor RS3 connected between the second divider output node 305 and the second emulation circuit output node 110b as shown.

In this example, moreover, approximately half the ripple voltage can be compensated or canceled via the emulation circuit 300 by providing resistors RC1a and RC1b of generally equal first resistance values "RC1", the resistors RS1a and RS1b of generally equal second resistance value "RS1", preferably much greater than the first resistance value RC1, where the discharging resistor RS2a has a third resistance value RS2, and the compensation resistor RC2 has a fourth resistance value RC2. For a DC to DC converter switching period Tsw, a ratio K of the fourth and first resistance values RC2/RC1 is given by the following formula in order to provide compensation for approximately half the ripple voltage:

$$K=2CS1*(0.5RS1+RS2)/Tsw.$$

In this implementation, the SW node voltage is divided by 2 for both the CSP and the CSN, and the average voltage CSN is equal to a half of the voltage Vout at the converter output node 28.

Other implementations are possible, wherein the illustrated compensation circuits 203 and 303 include NMOS switching devices, but other switching components and configurations can be used by which the emulation circuits 200, 300 are compensated in a manner generally proportional to the output voltage Vout and the off time Toff. The disclosed embodiments and the various compensation techniques of the present disclosure may be employed in a variety of different DC to DC converter topologies, including without limitation the above-described on-time controlled buck converter, and the current emulation circuits of the present disclosure advantageously provide improvements through compensation without requiring buffers, sample hold circuits, etc., while addressing the above described DCM undershoot 126 and CCM/CCM transition operating point offset 128.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:
1. A DC to DC converter, comprising:
   a switching circuit comprising a first switch coupled between a first voltage node (Vin) and a switching node, and a second switch coupled between the switching node and a circuit ground;
   an inductor with a first terminal coupled with the switching node and a second terminal coupled with a converter output node;
   a modulator circuit providing a first switching control signal to selectively turn the first switch on or off and a second switching control signal to selectively turn the second switch on or off to control an output voltage at the converter output node;

an inductor current emulation circuit coupled with the switching node and the converter output node, and operative to provide a differential emulated current signal at first and second emulation circuit output nodes, the inductor current emulation circuit comprising:
  a first emulation circuit comprising an emulator capacitance coupled between the first emulation circuit output node and the converter output node or a constant voltage node, and a resistance coupled between the switching node and the first emulation circuit output node to conduct charging current flowing into the emulator capacitance when the first switch is on and to conduct discharging current flowing out of the emulator capacitance when the second switch is on, the first emulation circuit operative to provide a voltage signal having peaks and valleys at the first emulation circuit output node, and
  a second emulation circuit operative to provide a voltage signal to the second emulation circuit output node representing an average voltage of the switching node;
a loop comparator circuit with an output at least partially responsive to a sum of a differential voltage of the first and second emulation circuit output nodes and a differential voltage of a feedback voltage signal and a reference signal to regulate the output voltage based at least partially on valleys of the emulated current signal; and
a compensation circuit operatively coupled with the first emulation circuit to selectively reduce the discharging current flowing out of the emulator capacitance when the second switch is on to cancel at least a portion of a ripple voltage at the converter output node.

2. The DC to DC converter of claim 1, wherein the compensation circuit is operative to selectively reduce the discharging current flowing out of the emulator capacitance when the second switch is on to cancel approximately half a continuous conduction mode ripple voltage at the converter output node.

3. The DC to DC converter of claim 1, wherein the resistance of the first emulation circuit includes a first resistor, and wherein the compensation circuit includes:
  a second resistor coupled in series with the first resistor between the switching node and the first emulation circuit output node,
  a transistor connected in parallel with the second resistor, and
  an inverter with an inverter input coupled to a low side driver output, and an inverter output connected to a control terminal of the transistor, the inverter output providing a control signal to selectively turn the transistor on when the second switch is off to selectively short circuit the second resistor to reduce a total resistance between the switching node and the first emulation circuit output node, and to selectively turn the transistor off to increase the total resistance between the switching node and the first emulation circuit output node and reduce the discharging current flowing out of the emulator capacitance when the second switch is on.

4. The DC to DC converter of claim 3, wherein the DC to DC converter has a switching period Tsw, wherein first resistor has a first resistance value RS1, wherein the emulator capacitance has a capacitance value CS1, wherein the second resistor has a second resistance value RC1, and wherein the second resistance value RC1 set according to the following formula:

$$RC1 = (Tsw*RS1)/(2RS1*CS1 - Tsw).$$

5. The DC to DC converter of claim 3, wherein the second resistor and the transistor are connected in parallel with one another between the first resistor and the first emulation circuit output node.

6. The DC to DC converter of claim 3, wherein the second emulation circuit comprises:
  a first resistance connected to the switching node;
  a second resistance connected between the first resistance and the second emulation circuit output node;
  a first capacitance connected between a node joining the first and second resistances and the converter output node or the constant voltage node; and
  a second capacitance connected between the second emulation circuit output node and the converter output node or the constant voltage node.

7. The DC to DC converter of claim 3, wherein the compensation circuit is operative to selectively reduce the discharging current flowing out of the emulator capacitance when the second switch is on to cancel approximately half a continuous conduction mode ripple voltage at the converter output node.

8. The DC to DC converter of claim 1:
wherein the first emulation circuit comprises:
  a first voltage divider circuit connected between the switching node and a circuit ground, with a divider output node providing a fraction of the voltage of the switching node relative to the circuit ground, and
  a discharging resistor connected between the divider output node and the first emulation circuit output node to conduct the charging current flowing into the emulator capacitance when the first switch is on and to conduct the discharging current flowing out of the emulator capacitance when the second switch is on;
wherein the second emulation circuit is operative to provide a voltage signal to the second emulation circuit output node representing a fraction of an average voltage of the switching node; and
wherein the compensation circuit comprises:
  a compensation resistor with a first terminal connected to a second divider circuit node of the first voltage divider circuit, and
  a transistor connected between the compensation resistor and the converter output node, the transistor having a control terminal connected to receive a signal from a low side driver output to selectively turn the transistor on when the second switch is on to selectively allow the compensation resistor to conduct and reduce the discharging current flowing through the discharging resistor out of the emulator capacitance when the second switch is on.

9. The DC to DC converter of claim 8:
wherein the first voltage divider circuit comprises:
  a first divider resistor connected to the switching node, and having a first resistance value RC1,
  a second divider resistor connected between the first divider resistor and the divider output node, and having a second resistance value RS1 greater than the first resistance value RC1,
  a third divider resistor connected between the divider output node and the second divider circuit node, and having the second resistance value RS1, and
  a fourth divider resistor connected between the second node and the circuit ground, and having the first resistance value RC1;
wherein the discharging resistor has a third resistance value RS2;

wherein the compensation resistor has a fourth resistance value RC2;
wherein the wherein the DC to DC converter has a switching period Tsw;
wherein the emulator capacitance has a capacitance value CS1; and
wherein a ratio K of the fourth and first resistance values RC2/RC1 is given by the following formula:

$$K=2*CS1(0.5RS1+RS2)/Tsw.$$

10. The DC to DC converter of claim 9:
wherein the second emulation circuit comprises:
a second voltage divider circuit including two generally equal second divider circuit resistances individually of the third resistance value RS2 and connected in series with one another between the switching node and the circuit ground, with a second divider output node joining the second divider circuit resistances and providing a voltage approximately equal to half the voltage of the switching node relative to the circuit ground, and
an RC circuit connected between the second divider output node and the second emulation circuit output node.

11. The DC to DC converter of claim 8:
wherein the second emulation circuit comprises:
a second voltage divider circuit including two generally equal second divider circuit resistances connected in series with one another between the switching node and the circuit ground, with a second divider output node joining the second divider circuit resistances and providing a voltage approximately equal to half the voltage of the switching node relative to the circuit ground, and
an RC circuit connected between the second divider output node and the second emulation circuit output node.

12. The DC to DC converter of claim 8, wherein the compensation circuit is operative to selectively reduce the discharging current flowing out of the emulator capacitance when the second switch is on to cancel approximately half a continuous conduction mode ripple voltage at the converter output node.

13. The DC to DC converter of claim 1, wherein the second emulation circuit comprises an RC circuit including at least one resistance coupled between the switching node and the second emulation circuit output node, and at least one capacitance with a first terminal connected to the second emulation circuit output node and a second terminal connected to one of the converter output node and a circuit ground.

14. The DC to DC converter of claim 1, comprising an amplifier with first and second inputs individually coupled to a corresponding one of the first and second emulation circuit output nodes, and amplifying the differential emulated current signal to provide the emulated current signal to the third input of the loop comparator circuit.

15. An inductor current emulation circuit for providing a signal representing current flowing in an output inductor connected between a switching node and a converter output node of a DC to DC converter, the inductor current emulation circuit comprising:
a first circuit operative to provide a first voltage signal at a first emulation circuit output node, comprising an emulator capacitance coupled between the first emulation circuit output node and a DC to DC converter output node or a constant voltage node, and a resistance coupled between the switching node and the first emulation circuit output node to conduct discharging current flowing out of the emulator capacitance when a low side converter switch is on to connect the switching node to a circuit ground;
a second circuit including at least one resistance coupled between the switching node and a second emulation circuit output node, and at least one capacitance with a first terminal connected to the second emulation circuit output node and a second terminal connected to one of the converter output node and a circuit ground, the second circuit operative to provide a second voltage signal to the second emulation circuit output node representing an average voltage of the switching node; and
a compensation circuit operatively coupled with the first circuit to selectively reduce the discharging current flowing out of the emulator capacitance when the low side converter switch is on.

16. The inductor current emulation circuit of claim 15:
wherein the resistance of the first emulation circuit includes a first resistor;
wherein the compensation circuit includes:
a second resistor coupled in series with the first resistor between the switching node and the first emulation circuit output node,
a transistor connected in parallel with the second resistor, and
an inverter with an inverter input coupled to a low side driver output of the DC to DC converter, and an inverter output connected to a control terminal of the transistor, the inverter output providing a control signal to selectively turn the transistor on when the low side converter switch is off to selectively short circuit the second resistor to reduce a total resistance between the switching node and the first emulation circuit output node, and to selectively turn the transistor off to increase the total resistance between the switching node and the first emulation circuit output node and reduce the discharging current flowing out of the emulator capacitance when the low side converter switch is on; and
wherein the second circuit comprises:
a first resistance connected to the switching node,
a second resistance connected between the first resistance and the second emulation circuit output node,
a first capacitance connected between a node joining the first and second resistances and the converter output node, and
a second capacitance connected between the second emulation circuit output node and the converter output node.

17. The inductor current emulation circuit of claim 16, wherein the DC to DC converter has a switching period Tsw, wherein first resistor has a first resistance value RS1, wherein the emulator capacitance has a capacitance value CS1, wherein the second resistor has a second resistance value RC1, and wherein the second resistance value RC1 is set according to the following formula:

$$RC1=(Tsw*RS1)/(2RS1*CS1-Tsw).$$

18. The inductor current emulation circuit of claim 15:
wherein the first circuit comprises:
a first voltage divider circuit connected between the switching node and the circuit ground, with a divider output node providing a voltage at a fraction of the voltage of the switching node relative to the circuit ground, and a discharging resistor connected between the divider output node and the first emulation circuit output node to conduct the discharging current flowing out of the emulator capacitance when the low side converter switch is on;

wherein the second circuit comprises:
- a second voltage divider circuit including two second divider circuit resistances connected in series with one another between the switching node and the circuit ground, with a second divider output node joining the second divider circuit resistances and providing a voltage at a fraction of the voltage of the switching node relative to the circuit ground, and
- an RC circuit connected between the second divider output node and the second emulation circuit output node; and wherein the compensation circuit comprises:
- a compensation resistor with a first terminal connected to a second divider circuit node of the first voltage divider circuit, and
- a transistor connected between the compensation resistor and the converter output node, the transistor having a control terminal connected to receive a signal from a low side driver output to selectively turn the transistor on when the low side converter switch is on to selectively allow the compensation resistor to conduct and reduce the discharging current flowing through the discharging resistor out of the emulator capacitance when the low side converter switch is on.

19. The inductor current emulation circuit of claim 18:
wherein the first voltage divider circuit comprises:
- a first divider resistor connected to the switching node, and having a first resistance value RC1,
- a second divider resistor connected between the first divider resistor and the divider output node, and having a second resistance value RS1 greater than the first resistance value RC1,
- a third divider resistor connected between the divider output node and the second divider circuit node, and having the second resistance value RS1, and
- a fourth divider resistor connected between the second node and the circuit ground, and having the first resistance RC1;

wherein the discharging resistor has a third resistance value RS2;

wherein the compensation resistor has a fourth resistance value RC2;

wherein the wherein the DC to DC converter has a switching period Tsw;

wherein the emulator capacitance has a capacitance value CS1; and wherein a ratio K of the fourth and first resistance values RC2/RC1 is given by the following formula:

$$K=2*CS1(0.5RS1+RS2)/Tsw.$$

20. A pulse width modulation controller for controlling high side and low side switches connected to an output inductor at a converter switching node to provide a regulated DC output voltage at a converter output terminal of a DC to DC converter, the pulse width modulation controller comprising:
- a modulator circuit providing a first switching control signal to selectively turn the high side converter switch on or off and a second switching control signal to selectively turn the low side switch on or off to control the output voltage at the converter output node;
- a loop comparator circuit with an output at least partially responsive to a sum of a differential voltage of an emulated current signal and a differential voltage of a feedback voltage signal and a reference to regulate the output voltage based at least partially on valleys of the emulated current signal;
- an inductor current emulation circuit coupled with the switching node and the converter output node, and having first and second emulation circuit output nodes providing a differential emulated current signal to the loop comparator circuit, the inductor current emulation circuit comprising:
  - a first emulation circuit comprising an emulator capacitance coupled between the first emulation circuit output node and the converter output node or a constant voltage node, and a resistance coupled between the switching node and the first emulation circuit output node to conduct discharging current flowing out of the emulator capacitance when the low side switch is on, the first emulation circuit operative to provide a voltage signal having peaks and valleys at the first emulation circuit output node, and
  - a second emulation circuit operative to provide a voltage signal to the second emulation circuit output node representing an average voltage of the switching node; and
- a compensation circuit operatively coupled with the first emulation circuit to selectively reduce the discharging current flowing out of the emulator capacitance in proportion to the output voltage when the low side switch is on.

* * * * *